United States Patent
Jia et al.

(10) Patent No.: US 11,672,042 B2
(45) Date of Patent: Jun. 6, 2023

(54) ENDPOINT DEVICE RADIO LINK FAILURE INFORMATION REPORTING

(71) Applicant: AT&T Intellectual Property I, L.P., Atlanta, GA (US)

(72) Inventors: Yupeng Jia, Austin, TX (US); Hongyan Lei, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 73 days.

(21) Appl. No.: 17/087,768

(22) Filed: Nov. 3, 2020

(65) Prior Publication Data

US 2022/0141907 A1 May 5, 2022

(51) Int. Cl.
*H04W 76/18* (2018.01)
*H04W 76/16* (2018.01)
*H04W 76/11* (2018.01)
*H04W 64/00* (2009.01)

(52) U.S. Cl.
CPC ......... *H04W 76/18* (2018.02); *H04W 64/003* (2013.01); *H04W 76/11* (2018.02); *H04W 76/16* (2018.02)

(58) Field of Classification Search
None
See application file for complete search history.

(56) References Cited

U.S. PATENT DOCUMENTS

2015/0296438 A1 * 10/2015 Wu .................. H04W 74/0833
370/221

2018/0124612 A1 * 5/2018 Babaei ................ H04W 72/042
2021/0195439 A1 * 6/2021 Prabhakar ............ H04W 24/02
(Continued)

FOREIGN PATENT DOCUMENTS

| EP | 4007337 | * | 1/2022 |
| WO | WO2021019472 | * | 7/2019 |
| WO | WO2022075626 | * | 9/2021 |

OTHER PUBLICATIONS

ETSI, LTE; Evolved Universal Terrestrial Radio Access (E_UTRA); LTE Positioning Protocol (LPP) (3GPP TS 36.355 version 14.2.0 Release 14), 2017, 3GPP TS 36.355 version 14.2.0, pages (Year: 2017).*

(Continued)

*Primary Examiner* — Mohammad S Adhami

(57) ABSTRACT

Example methods, computer-readable media, and endpoint devices for transmitting a failure information message containing a base station identifier, a frequency identifier, and location information of the endpoint device associated with a radio link failure are described. For instance, a processing system of an endpoint device including at least one processor may detect a radio link failure for a radio link between the endpoint device and a base station of a cellular network, determine location information of the endpoint device, the location information includes at least a coordinate position of the endpoint device, and determine a base station identifier that identifies the base station and a frequency identifier associated with a frequency of the radio link. The processing system may further transmit a failure information message containing the base station identifier, the frequency identifier, and the location information of the endpoint device.

20 Claims, 4 Drawing Sheets

(56) References Cited

U.S. PATENT DOCUMENTS

2021/0337616 A1* 10/2021 Zhang .................. H04W 76/19
2021/0409900 A1* 12/2021 Wang ................... H04W 48/16

OTHER PUBLICATIONS

ETSI TS 123 032, Digital cellular telecommunications system (Phase 2+) Universal Mobile Telecommunications System (UMTS) Universal Geographical Area Description (GAD), 2011, 3GPP TS 23.032 version 10,0,0 Release 10, pp. 10,19, and 22.*

3Gpp TR 37.816 V16.0.0, "3$^{rd}$ Generation Partnership Project; Technical Specification Group Radio Access Network; Study on RAN-centric data collection and utilization for LTE and NR", Release 16, Jul. 2017, 35 pages.

* cited by examiner

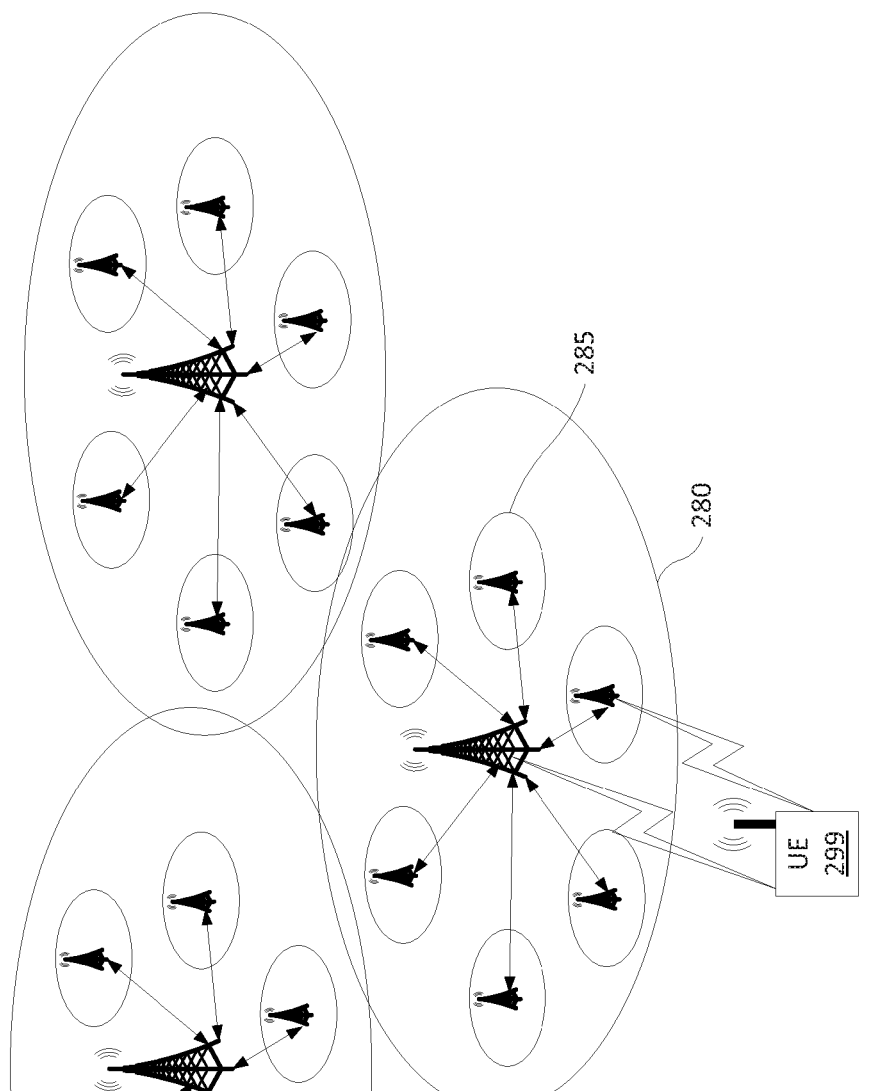
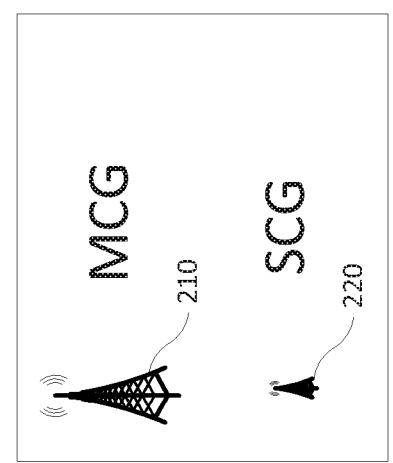
FIG. 2

ENDPOINT DEVICE RADIO LINK FAILURE INFORMATION REPORTING

The present disclosure relates generally to cellular networks, and more particularly to methods, non-transitory computer-readable media, and devices for transmitting a failure information message containing a base station identifier, a frequency identifier, and endpoint device positioning information associated with a radio link failure.

BACKGROUND

A cloud radio access network (RAN) is part of the $3^{rd}$ Generation Partnership Project (3GPP) fifth generation (5G) specifications for mobile networks. As part of the migration of cellular networks towards 5G, a cloud RAN may be coupled to an Evolved Packet Core (EPC) network until new cellular core networks are deployed in accordance with 5G specifications. For instance, a cellular network in a "non-stand alone" (NSA) mode architecture may include 5G radio access network components supported by a fourth generation (4G)/Long Term Evolution (LTE) core network (e.g., an EPC network). However, in a 5G "standalone" (SA) mode point-to-point or service-based architecture, components and functions of the EPC network may be replaced by a 5G core network.

SUMMARY

In one example, the present disclosure discloses a method, computer-readable medium, and endpoint device for transmitting a failure information message containing a base station identifier, a frequency identifier, and endpoint device positioning information associated with a radio link failure. For example, a processing system of an endpoint device having at least one processor may detect a radio link failure for a radio link between the endpoint device and a base station of a cellular network, determine location information of the endpoint device, the location information includes at least a coordinate position of the endpoint device, and determine a base station identifier that identifies the base station and a frequency identifier associated with a frequency of the radio link. The processing system may further transmit a failure information message containing the base station identifier, the frequency identifier, and the location information of the endpoint device.

BRIEF DESCRIPTION OF THE DRAWINGS

The teachings of the present disclosure can be readily understood by considering the following detailed description in conjunction with the accompanying drawings, in which:

FIG. 2 illustrates an example cellular network having a primary cell group and secondary cell group configuration, in accordance with the present disclosure;

To facilitate understanding, similar reference numerals have been used, where possible, to designate elements that are common to the figures.

DETAILED DESCRIPTION

Figure 1:
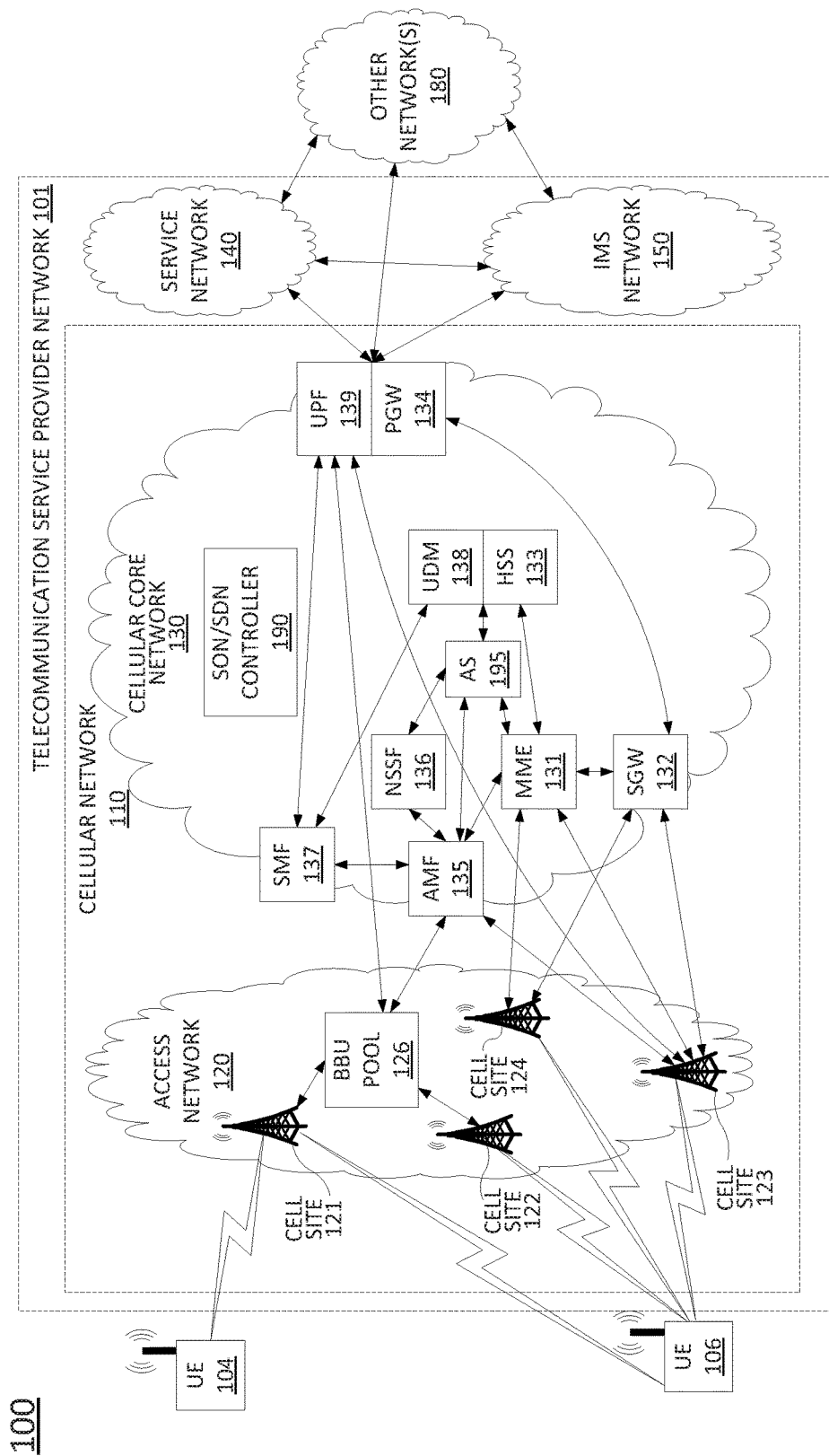
FIG. 1 illustrates a block diagram of an example system, in accordance with the present disclosure.

The present disclosure broadly discloses methods, computer-readable media, and devices for transmitting a failure information message containing a base station identifier, a frequency identifier, and endpoint device positioning information associated with a radio link failure. In particular, examples of the present disclosure enable an endpoint device, or user equipment (UE), to report detailed position/location (e.g., geographic coordinates), serving frequency, and cell/base station identifier (ID) to the cellular network when a radio link failure (RLF) occurs and/or when a secondary cell group (SCG) failure occurs. In accordance with the present disclosure, it should be noted that as referred to herein, the term "radio link failure" may include various SCG failures as well as dual active protocol stack (DAPS) handover failures. In one example, the detailed endpoint device position/location, serving frequency, and base station identifier at (or near) the moment of failure may be used for identifying coverage gaps, troubleshooting, and optimizing the cellular network. In one example, the present disclosure also enables a network operator to optimize secondary cell deployments in accordance with detailed endpoint device location/position, secondary cell identifier, and frequency information that may be included in a secondary cell group (SCG) failure message. In addition, in one example, the present disclosure may enable large-scale radio access network (RAN)-automation via collecting and analyzing endpoint device reports (e.g., instead of drive tests with specific routes), thus reducing the time and complexity of information collection, while improving network performance.

Examples of the present disclosure relate to radio link failures involving dual connectivity (DC) and non-DC cellular network configurations or architectures, and involving one or both of two different types of cellular radio access technologies (RATs), e.g., 5G (new radio (NR)) and/or 4G/LTE. In addition, examples of the present disclosure relate to radio link failures associated with primary cells (PCells) (e.g., "master" nodes (MNs), or a primary cell group (PCG)/master cell group (MCG)) as well radio link failures associated with secondary cells (SCells) (e.g., secondary nodes (SNs) or a secondary cell group (SCG)) for both inter-RAT and intra-RAT dual connectivity examples.

In the case of multiple radio dual connectivity (MR-DC), e.g., EN-DC (Evolved Uniform Terrestrial Radio Access (EUTRA)-New Radio (NR) (EUTRA-NR) Dual Connectivity (EN-DC)), NGEN-DC (E-UTRA NR Dual Connectivity with E-UTRA Network (E-UTRAN) connected to a 5G core (5GC) network), NE-DC (NR E-UTRA Dual Connectivity), and NR-DC (NR-NR Dual Connectivity), a secondary node (such as a millimeter wave sub6 frequency range 1 (FR1) NR high band cell or frequency range 2 (FR2) cell) can be configured (e.g., add, release, change) based on radio frequency (RF) signal strength. In addition, radio link failure (RLF) information (and/or secondary node (SN) change failure information) can be exchanged between a secondary node (SCell/SN) and a primary node (Pcell/MN). In accordance with the present disclosure, detailed endpoint device/UE location/position information, a cell/base station ID (e.g., of a primary cell or a secondary cell associated with a radio link failure), and a frequency of a radio link associated with the radio link failure (e.g., a center frequency) may all be included in the failure signaling message(s).

PCell/MN/MCG RLF in DC and Non-DC

In examples of non-dual connectivity, or for a radio link failure associated with a primary cell in a dual connectivity scenario (for both intra-RAT/non-DC and for inter-RAT/multi-radio dual connectivity (MR-DC)), an endpoint device may detect a radio link failure of a PCell/MN and/or MCG and may transmit a failure information message to the cellular network. In one example, the radio link failure may comprise a radio link control (RLC) failure, e.g., out-of-sync indications or early out-of-sync indications from a primary cell (Pcell), a maximum number of retransmissions for RLC, etc., failure of a RLC bearer, a random access problem, a DAPS (dual active protocol stack) handover failure, e.g., in the case of a DAPS equipped endpoint device, a beam failure recovery procedure failure, a backhaul radio link control channel failure, and so forth. In one example, the failure information message may be similar to a failure information message of 3GPP Technical Standard (TS) 36.331 (cross-reference to European Telecommunications Standards Institute (ETSI) TS 136.331) (e.g., for RLF associated with LTE/UTRA non-dual connectivity and/or RLF associated with a PCell in LTE-LTE DC), e.g., a "Failure-Information" message, but specifically including a base station identifier, e.g., a cell ID, a frequency identifier, and endpoint device positioning information associated with the RLF involving the base station/cell (e.g., an eNodeB). In another example, the failure information message may be similar to a failure information message of 3GPP TS 38.331/ETSI TS 138.331, e.g., a "FailureInformation" message, but also specifically including a base station identifier, a frequency identifier, and endpoint device positioning information associated with a radio link failure involving the base station/cell (e.g., a gNB/NR).

In each case, the positioning information may comprise geographic coordinates, e.g., latitude and longitude to a precision in accordance with the measuring capability of the endpoint device. In one example, the positioning information may also include an altitude, or an elevation. Alternatively, or in addition, in one example, the positioning information may also include endpoint device orientation information, such as a yaw, a pitch, or a roll, and/or a bearing (which may comprise a compass bearing, e.g., with reference to true north or magnetic north, a bearing to the base station, or other reference point, etc.). In one example, the endpoint device positioning information may further include a velocity.

In addition, the frequency identifier may comprise an indication of the center frequency, or carrier frequency, associated with a radio link for which the radio link failure is detected. Alternatively, or in addition, the frequency identifier may comprise a logical channel identifier that can be mapped to the center/carrier frequency of the radio link. The base station identifier may be an identifier assigned to a particular base station, or a cell that is defined by the base station. As such, the term base station identifier and cell identifier are used interchangeably herein. In one example, the base station identifier may comprise a global cell ID that is unique across an entire cellular network (e.g., nationwide). Alternatively, or in addition, the base station identifier may comprise a local cell ID that is unique across at least a portion of an entire cellular network, e.g., within a particular state or region, within a particular network slice, etc.

In each example, the failure information message may also include a type of radio link failure (RLF), or cause such as: a RLC failure, e.g., detected out-of-sync indications or early out-of-sync indications from a primary cell Pcell, a maximum number of retransmissions for RLC, etc., failure of a RLC bearer, a random access problem, a beam failure recovery procedure failure, a backhaul radio link control channel failure, a DAPS handover failure, and so forth. In one example, the abovementioned base station identifier, frequency identifier, endpoint device positioning information (and, in one example, failure type) may be included in one or several respective information elements (IEs) of the failure information message.

In one example, the failure information message may be transmitted by the endpoint device on an uplink dedicated control channel (DCCH) logical channel, e.g., over a signaling radio bearer (SRB), such as SRB1 or SRB3. In this regard, it should also be noted that in one example, the failure information message may be similar to a "MCGfailureInformation" message of 3GPP TS 38.331/ETSI TS 138.331, but again specifically including a base station identifier, e.g., a cell ID, a frequency identifier, and endpoint device positioning information associated with a radio link failure involving the base station/cell. For instance, the "MCGfailureInformation" message may be used for an endpoint device configured with a split signaling radio bearer 1 (SRB1) or a signaling radio bearer 3 (SRB3). In other words, the failure information message may be transmitted to the cellular network via a NR/5G SCell/SN or secondary cell group (SCG) over which the split SRB1 or SRB3 remains available.

SCell/SN/SCG RLF in DC

As noted above, examples of the present disclosure also relate to a failure of a radio link between an endpoint device and a secondary cell or node (Scell/SN) or secondary cell group (SCG) for both intra-RAT dual connectivity and inter-RAT dual connectivity (e.g., multi-radio DC (MR-DC)). Accordingly, an endpoint device may similarly include detailed endpoint device positioning information, base station identifier, and frequency information in a failure information message that is transmitted to the cellular network with regard to an SCell/SN/SCG radio link failure. For instance, in an example, of LTE-LTE dual connectivity or NR-NR dual connectivity, for a radio link failure associated with an SCell or SCG, the failure information message may be similar to a failure information message of 3GPP TS 36.331/ETSI TS 136.331 or 3GPP TS 38.331/ETSI TS 138.331, e.g., a "SCGFailureInformation" message, but specifically including a cell ID/base station identifier, a frequency identifier, and endpoint device positioning information.

In an example of EUTRA-NR Dual Connectivity (EN-DC) (with LTE as PCell and NR as SCell), endpoint device positioning information, a base station identifier, and frequency information associated with a radio link failure for a secondary cell/node (SN, SCell, or SGC) may similarly be included in a failure information message. In one example, the failure information message may be similar to a failure information message of 3GPP TS 36.331/ETSI TS 136.33, such as a "SCGFailureInformationNR" message, but specifically including a base station identifier/cell ID, a frequency identifier, and endpoint device positioning information. Likewise, in an example of NR-LTE dual connectivity, e.g., NR E-UTRA dual connectivity or NE-DC (with NR as PCell and LTE as Scell), for a radio link failure associated with the SCell/SN/SCG, the endpoint device may similarly include endpoint device positioning information, a base station identifier, and frequency information in a failure information message. In one example, the failure information message may be similar to a failure information message of 3GPP TS 36.331/ETSI TS 136.33, such as a "SCGFailureInformationEUTRA" message, but again specifically including a base station identifier/cell ID, a frequency identifier, and endpoint device positioning information.

In each case, the positioning information may comprise detailed endpoint device positioning information as described in the examples above relating to PCell/MCG radio link failures. In addition, in each case, the failure information message may also include a detected type of radio link failure (RLF), or cause. For instance, types of radio link failure, e.g., causes, may be detected by the endpoint device and may be the same or similar to the possible failure types/causes discussed in the examples above, such as: exceeding a maximum uplink transmission timing difference, a random access problem, a maximum number of retransmissions for radio link control, a secondary cell group change failure, a reconfiguration with synchronization failure, a SRB3 (signaling radio bearer 3) IP check/integrity failure, a timer expiry (e.g., T313, T310, T312, etc.), a failed beam failure recovery procedure, a backhaul radio link control channel failure, and so forth.

In one example, the failure information message associated with an SCell/SN/SCG radio link failure may be transmitted by the endpoint device on an uplink dedicated control channel (DCCH) logical channel. In one example, the failure information message may be transmitted to the cellular network via a PCell and/or MCG. For instance, since the radio link failure may relate to an SCell/SN/SCG, it may be assumed that a PCell/MN and/or MCG remains available (e.g., with the endpoint device in a state of radio resource control connected (RRC connected)), such that the failure information message may be transmitted via the DCCH logical channel on a signaling radio bearer 1 (SRB1), e.g., to the PCell/MN and/or MCG.

Notably, examples of the present disclosure send the failure information message, including detailed location, base station identifier, and frequency identifier (and/or failure type information), automatically after a failure as part of the signaling protocol itself, e.g., in contrast to storing certain information and waiting for a request to transmit a report to the network. In addition, while a cell ID/base station identifier may localize a failure to some extent, it is not nearly precise enough to enable detailed troubleshooting, network planning, and network reconfiguration/optimization (e.g., via a self-optimizing network (SON) controller, or the like). At the same time, geographic coordinates alone may also be insufficient because a plurality of cells (which may include overlapping cells from a primary cell group, and/or multiple cells of a SCG) may be capable of serving a particular location, while a failure, or failures may be limited to only one of such cells. In addition, certain types of radio link failures may involve a lack or loss of connection such that the cellular network may be unaware of the particular base station, e.g., to which an endpoint device is attempting to connect or reconnect. Moreover, the carrier frequency is also important because not all frequencies may be similarly affected by certain causes of radio link failures. For instance, a large truck may be blocking a line of sight between a base station and an endpoint device. However, certain frequencies may suffer greater loss and/or certain frequencies may have better opportunities for multipath due to scattering and reflections off of other features in the environment, and so on. These and other aspects of the present disclosure are discussed in greater detail below in connection with the examples of FIGS. 1-4.

FIG. 1 illustrates an example network, or system 100 in which examples of the present disclosure for transmitting a failure information message containing a base station identifier, a frequency identifier, and endpoint device positioning information associated with a radio link failure may operate. In one example, the system 100 includes a telecommunication service provider network 101. The telecommunication service provider network 101 may comprise a cellular network 110 (e.g., a 4G/Long Term Evolution (LTE) network, a 4G/5G hybrid network, or the like), a service network 140, and an IP Multimedia Subsystem (IMS) network 150. The system 100 may further include other networks 180 connected to the telecommunication service provider network 101.

In one example, the cellular network 110 comprises an access network 120 and a cellular core network 130. In one example, the access network 120 comprises a cloud RAN. For instance, a cloud RAN is part of the 3GPP 5G specifications for mobile networks. As part of the migration of cellular networks towards 5G, a cloud RAN may be coupled to an Evolved Packet Core (EPC) network until new cellular core networks are deployed in accordance with 5G specifications. In one example, access network 120 may include cell sites 121 and 122 and a baseband unit (BBU) pool 126. In a cloud RAN, radio frequency (RF) components, referred to as remote radio heads (RRHs), may be deployed remotely from baseband units, e.g., atop cell site masts, buildings, and so forth. In one example, the BBU pool 126 may be located at distances as far as 20-80 kilometers or more away from the antennas/remote radio heads of cell sites 121 and 122 that are serviced by the BBU pool 126. It should also be noted in accordance with efforts to migrate to 5G networks, cell sites may be deployed with new antenna and radio infrastructures such as multiple input multiple output (MIMO) antennas, and millimeter wave antennas. In this regard, a cell, e.g., the footprint or coverage area of a cell site may in some instances be smaller than the coverage provided by NodeBs or eNodeBs of 3G-4G RAN infrastructure. For example, the coverage of a cell site utilizing one or more millimeter wave antennas may be 1000 feet or less.

Although cloud RAN infrastructure may include distributed RRHs and centralized baseband units, a heterogeneous network may include cell sites where RRH and BBU components remain co-located at the cell site. For instance, cell site 123 may include RRH and BBU components. Thus, cell site 123 may comprise a self-contained "base station." With regard to cell sites 121 and 122, the "base stations" may comprise RRHs at cell sites 121 and 122 coupled with respective baseband units of BBU pool 126.

Figure 4:
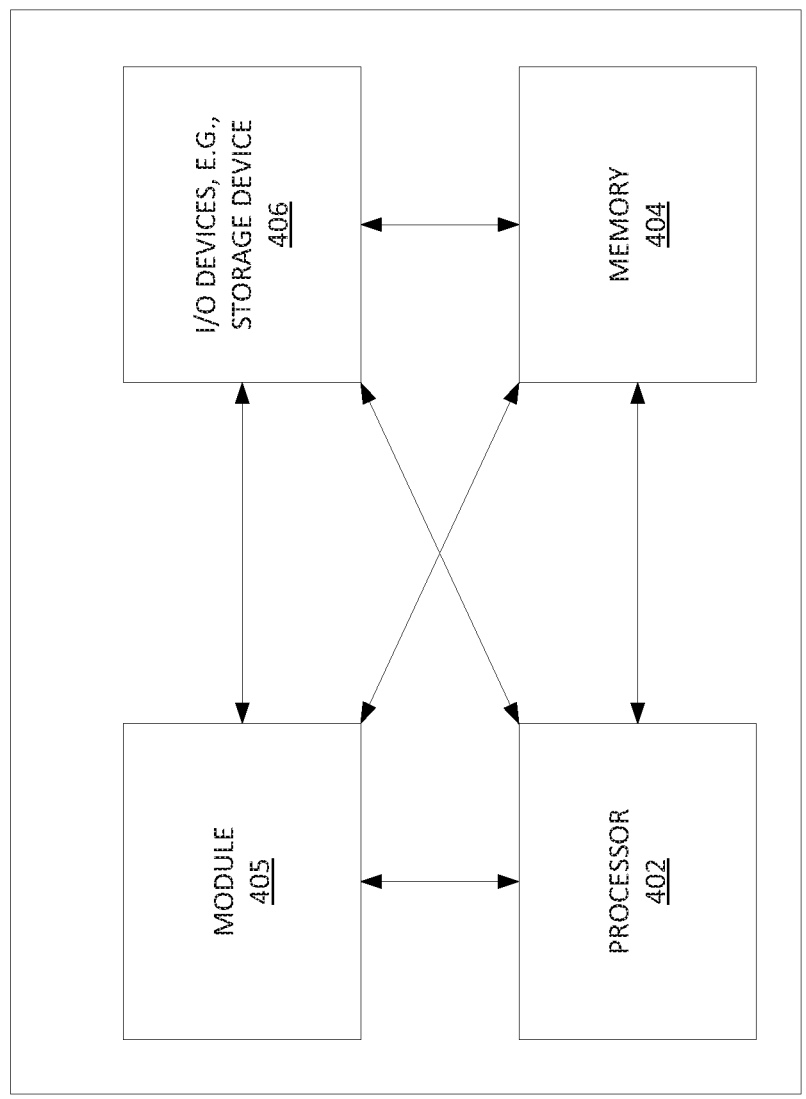
FIG. 4 illustrates a high level block diagram of a computing device specifically programmed to perform the steps, functions, blocks and/or operations described herein.

In accordance with the present disclosure, any one or more of cell sites 121-123 may be deployed with antenna and radio infrastructures, including multiple input multiple output (MIMO) and millimeter wave antennas. Furthermore, in accordance with the present disclosure, a base station (e.g., cell sites 121-123 and/or baseband units within BBU pool 126) may comprise all or a portion of a computing system, such as computing system 400 as depicted in FIG. 4, and may be configured to provide one or more functions in connection with examples of the present disclosure for transmitting a failure information message containing a base station identifier, a frequency identifier, and endpoint device positioning information associated with a radio link failure.

In one example, access network 120 may include both 4G/LTE and 5G/NR radio access network infrastructure. For example, access network 120 may include cell site 124, which may comprise 4G/LTE base station equipment, e.g., an eNodeB. In addition, access network 120 may include cell sites comprising both 4G and 5G base station equipment, e.g., respective antennas, feed networks, baseband equipment, and so forth. For instance, cell site 123 may include both 4G and 5G base station equipment and corresponding connections to 4G and 5G components in cellular core network 130. Although access network 120 is illustrated as including both 4G and 5G components, in another example, 4G and 5G components may be considered to be contained within different access networks. Nevertheless, such different access networks may have a same wireless coverage area, or fully or partially overlapping coverage areas.

In one example, the cellular core network 130 provides various functions that support wireless services in the LTE environment. In one example, cellular core network 130 is an Internet Protocol (IP) packet core network that supports both real-time and non-real-time service delivery across a LTE network, e.g., as specified by the 3GPP standards. In one example, cell sites 121 and 122 in the access network 120 are in communication with the cellular core network 130 via baseband units in BBU pool 126.

In cellular core network 130, network devices such as Mobility Management Entity (MME) 131 and Serving Gateway (SGW) 132 support various functions as part of the cellular network 110. For example, MME 131 is the control node for LTE access network components, e.g., eNodeB aspects of cell sites 121-123. In one embodiment, MME 131 is responsible for UE (User Equipment) tracking and paging (e.g., such as retransmissions), bearer activation and deactivation process, selection of the SGW, and authentication of a user. In one embodiment, SGW 132 routes and forwards user data packets, while also acting as the mobility anchor for the user plane during inter-cell handovers and as an anchor for mobility between 5G, LTE and other wireless technologies, such as 2G and 3G wireless networks.

In addition, cellular core network 130 may comprise a Home Subscriber Server (HSS) 133 that contains subscription-related information (e.g., subscriber profiles), performs authentication and authorization of a wireless service user, and provides information about the subscriber's location. The cellular core network 130 may also comprise a packet data network (PDN) gateway (PGW) 134 which serves as a gateway that provides access between the cellular core network 130 and various packet data networks (PDNs), e.g., service network 140, IMS network 150, other network(s) 180, and the like.

The foregoing describes long term evolution (LTE) cellular core network components (e.g., EPC components). In accordance with the present disclosure, cellular core network 130 may further include other types of wireless network components e.g., 2G network components, 3G network components, 5G network components, etc. Thus, cellular core network 130 may comprise an integrated network, e.g., including any two or more of 2G-5G infrastructures and technologies, and the like. For example, as illustrated in FIG. 1, cellular core network 130 further comprises 5G components, including: an access and mobility management function (AMF) 135, a network slice selection function (NSSF) 136, a session management function (SMF), a unified data management function (UDM) 138, and a user plane function (UPF) 139.

In one example, AMF 135 may perform registration management, connection management, endpoint device reachability management, mobility management, access authentication and authorization, security anchoring, security context management, coordination with non-5G components, e.g., MME 131, and so forth. NSSF 136 may select a network slice or network slices to serve an endpoint device, or may indicate one or more network slices that are permitted to be selected to serve an endpoint device. For instance, in one example, AMF 135 may query NSSF 136 for one or more network slices in response to a request from an endpoint device to establish a session to communicate with a PDN. The NSSF 136 may provide the selection to AMF 135, or may provide one or more permitted network slices to AMF 135, where AMF 135 may select the network slice from among the choices. A network slice may comprise a set of cellular network components, such as AMF(s), SMF(s), UPF(s), and so forth that may be arranged into different network slices which may logically be considered to be separate cellular networks. In one example, different network slices may be preferentially utilized for different types of services. For instance, a first network slice may be utilized for sensor data communications, Internet of Things (IoT), and machine-type communication (MTC), a second network slice may be used for streaming video services, a third network slice may be utilized for voice calling, a fourth network slice may be used for gaming services, and so forth.

In one example, SMF 137 may perform endpoint device IP address management, UPF selection, UPF configuration for endpoint device traffic routing to an external packet data network (PDN), charging data collection, quality of service (QoS) enforcement, and so forth. UDM 138 may perform user identification, credential processing, access authorization, registration management, mobility management, subscription management, and so forth. As illustrated in FIG. 1, UDM 138 may be tightly coupled to HSS 133. For instance, UDM 138 and HSS 133 may be co-located on a single host device, or may share a same processing system comprising one or more host devices. In one example, UDM 138 and HSS 133 may comprise interfaces for accessing the same or substantially similar information stored in a database on a same shared device or one or more different devices, such as subscription information, endpoint device capability information, endpoint device location information, and so forth. For instance, in one example, UDM 138 and HSS 133 may both access subscription information or the like that is stored in a unified data repository (UDR) (not shown).

UPF 139 may provide an interconnection point to one or more external packet data networks (PDN(s)) and perform packet routing and forwarding, QoS enforcement, traffic shaping, packet inspection, and so forth. In one example, UPF 139 may also comprise a mobility anchor point for 4G-to-5G and 5G-to-4G session transfers. In this regard, it should be noted that UPF 139 and PGW 134 may provide the same or substantially similar functions, and in one example, may comprise the same device, or may share a same processing system comprising one or more host devices.

It should be noted that other examples may comprise a cellular network with a "non-stand alone" (NSA) mode architecture where 5G radio access network components, such as a "new radio" (NR), "gNodeB" (or "gNB"), and so forth are supported by a 4G/LTE core network (e.g., an EPC network), or a 5G "standalone" (SA) mode point-to-point or service-based architecture where components and functions of an EPC network are replaced by a 5G core network (e.g., an "NC"). For instance, in non-standalone (NSA) mode architecture, LTE radio equipment may continue to be used for cell signaling and management communications, while user data may rely upon a 5G new radio (NR), including millimeter wave communications, for example. However, examples of the present disclosure may also relate to a hybrid, or integrated 4G/LTE-5G cellular core network such as cellular core network 130 illustrated in FIG. 1. In this regard, FIG. 1 illustrates a connection between AMF 135 and MME 131, e.g., an "N26" interface which may convey signaling between AMF 135 and MME 131 relating to endpoint device tracking as endpoint devices are served via 4G or 5G components, respectively, signaling relating to handovers between 4G and 5G components, and so forth.

In one example, service network 140 may comprise one or more devices for providing services to subscribers, customers, and or users. For example, telecommunication service provider network 101 may provide a cloud storage service, web server hosting, and other services. As such, service network 140 may represent aspects of telecommunication service provider network 101 where infrastructure for supporting such services may be deployed. In one example, other networks 180 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 180 may include different types of networks. In another example, the other networks 180 may be the same type of network. In one example, the other networks 180 may represent the Internet in general. In this regard, it should be noted that any one or more of service network 140, other networks 180, or IMS network 150 may comprise a packet data network (PDN) to which an endpoint device may establish a connection via cellular core network 130 in accordance with the present disclosure.

In one example, any one or more of the components of cellular core network 130 may comprise network function virtualization infrastructure (NFVI), e.g., SDN host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 131 may comprise a vMME, SGW 132 may comprise a vSGW, and so forth. Similarly, AMF 135, NSSF 136, SMF 137, UDM 138, and/or UPF 139 may also comprise NFVI configured to operate as VNFs. In addition, when comprised of various NFVI, the cellular core network 130 may be expanded (or contracted) to include more or less components than the state of cellular core network 130 that is illustrated in FIG. 1.

In this regard, the cellular core network 130 may also include a self-optimizing network (SON)/software defined network (SDN) controller 190. In one example, SON/SDN controller 190 may function as a self-optimizing network (SON) orchestrator that is responsible for activating and deactivating, allocating and deallocating, and otherwise managing a variety of network components. In accordance with the present disclosure, SON/SDN controller 190 may comprise all or a portion of a computing system, such as computing system 400 as depicted in FIG. 4, and may be configured to provide one or more functions in connection with examples of the present disclosure for transmitting a failure information message containing a base station identifier, a frequency identifier, and endpoint device positioning information associated with a radio link failure. For instance, SON/SDN controller 190 may activate and deactivate antennas/remote radio heads of cell sites 121 and 122, respectively, may steer antennas/remote radio heads of cell sites 121 and 122 (e.g., adjusting vertical tilt angles, azimuth bearings, beamwidths, power levels, and or other settings), may allocate or deallocate (or activate or deactivate) base-band units in BBU pool 126, may add (or remove) one or more network slices, and may perform other operations for adjusting configurations of components of cellular network 110 in accordance with the present disclosure. For instance, SON/SDN controller 190 may obtain failure information messages, or may receive instructions or aggregate information in accordance with failure information messages obtained from endpoint devices, and may configure and reconfigure components of access network 120 and/or cellular core network 130 in response thereto.

In one example, SON/SDN controller 190 may further comprise a SDN controller that is responsible for instantiating, configuring, managing, and releasing VNFs. For example, in a SDN architecture, a SDN controller may instantiate VNFs on shared hardware, e.g., NFVI/host devices/SDN nodes, which may be physically located in various places. In one example, the configuring, releasing, and reconfiguring of SDN nodes is controlled by the SDN controller, which may store configuration codes, e.g., computer/processor-executable programs, instructions, or the like for various functions which can be loaded onto an SDN node. In another example, the SDN controller may instruct, or request an SDN node to retrieve appropriate configuration codes from a network-based repository, e.g., a storage device, to relieve the SDN controller from having to store and transfer configuration codes for various functions to the SDN nodes.

Accordingly, the SON/SDN controller 190 may be connected directly or indirectly to any one or more network elements of cellular core network 130, and of the system 100 in general. Due to the relatively large number of connections available between SON/SDN controller 190 and other network elements, none of the actual links to the SON/SDN controller 190 are shown in FIG. 1. Similarly, intermediate devices and links between MME 131, SGW 132, cell sites 121-124, PGW 134, AMF 135, NSSF 136, SMF 137, UDM 138, and/or UPF 139, and other components of system 100 are also omitted for clarity, such as additional routers, switches, gateways, and the like.

FIG. 1 also illustrates various endpoint devices, e.g., user equipment (UE) 104 and 106. UE 104 and 106 may each comprise a cellular telephone, a smartphone, a tablet computing device, a laptop computer, a pair of computing glasses, a wireless enabled wristwatch, a wireless transceiver for a fixed wireless broadband (FWB) deployment, or any other cellular-capable mobile telephony and computing device (broadly, "an endpoint device"). In one example, each of the UE 104 and UE 106 may each be equipped with one or more directional antennas, or antenna arrays (e.g., having a half-power azimuthal beamwidth of 120 degrees or less, 90 degrees or less, 60 degrees or less, etc.), e.g., MIMO antenna(s) to receive multi-path and/or spatial diversity signals. Each of the UE 104 and UE 106 may also include a gyroscope and compass to determine orientation(s), a global positioning system (GPS) receiver for determining a location (e.g., in latitude and longitude, or the like), and so forth. In one example, each of the UE 104 and UE 106 may include a built-in/embedded barometer from which measurements may be taken and from which an altitude or elevation of the respective endpoint device may be determined. In one example, each of the UE 104 and UE 106 may also be configured to determine location/position from near field communication (NFC) technologies, such as Wi-Fi direct and/or other IEEE 802.11 communications or sensing (e.g., in relation to beacons or reference points in an environment), IEEE 802.15 based communications or sensing (e.g., "Bluetooth", "ZigBee", etc.), and so forth. In addition, in one example, each of the UE 104 and 106 may comprise all or a portion of a computing system, such as computing system 400 depicted in FIG. 4, and may be configured to perform one or more steps, functions, and/or operations for transmitting a failure information message containing a base station identifier, a frequency identifier, and endpoint device positioning information associated with a radio link failure, as described herein.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

As illustrated in FIG. 1, UE 104 may access wireless services via the cell site 121 (e.g., NR alone, where cell site 121 comprises a gNB), while UE 106 may access wireless services via any of the cell sites 121-124 located in the access network 120 (e.g., for NR non-dual connectivity, for LTE non-dual connectivity, for NR-NR DC, for LTE-LTE DC, for EN-DC, and/or for NE-DC). For instance, in one example, UE 106 may establish and maintain connections to the cellular core network 130 via multiple gNBs (e.g., cell sites 121 and 122 and/or cell sites 121 and 122 in conjunction with BBU pool 126). In another example, UE 106 may establish and maintain connections to the cellular core network 130 via a gNB (e.g., cell site 122 and/or cell site 122 in conjunction with BBU pool 126) and a eNodeB (e.g., cell site 124), respectively. In addition, either the gNB or the eNodeB may comprise a PCell, and the other may comprise an SCell for dual connectivity, as described herein. Furthermore, either or both of NR/5G and or EPC (4G/LTE) core network components may manage the communications between UE 106 and the cellular network 110) via cell site 122 and cell site 124.

In one example, UE 106 may also utilize different antenna arrays for 4G/LTE and 5G/NR, respectively. For instance, 5G antenna arrays may be arranged for beamforming in a frequency band designated for 5G high data rate communications. For instance, the antenna array for 5G may be designed for operation in a frequency band greater than 5 GHz. In one example, the array for 5G may be designed for operation in a frequency band greater than 20 GHz. In contrast, an antenna array for 4G may be designed for operation in a frequency band less than 5 GHz, e.g., 500 MHz to 3 GHz. In addition, in one example, the 4G antenna array (and/or the RF or baseband processing components associated therewith) may not be configured for and/or be capable of beamforming. Accordingly, in one example, UE 106 may turn off a 4G/LTE radio, and may activate a 5G radio to send a request to activate a 5G session to cell site 122 (e.g., when it is chosen to operate in a non-DC mode or an intra-RAT dual connectivity mode), or may maintain both radios in an active state for multi-radio (MR) dual connectivity (MR-DC).

In accordance with the present disclosure, UE 106 may perform steps, functions, and/or operations for transmitting a failure information message containing a base station identifier, a frequency identifier, and endpoint device positioning information associated with a radio link failure, as described herein. For instance, UE 106 may detect a radio link failure of a radio link associated with a primary cell in a non-dual connectivity scenario, or a primary cell or secondary cell associated with a dual-connectivity mode. In response, the UE 106 may determine location/position information of UE 106 (e.g., at or near the time of failure), and may generate and transmit to the cellular network 110 a failure information message containing a base station identifier (e.g., a cell ID), a frequency identifier, and the endpoint device location/position information (and/or the type of the radio link failure). In one example, the UE 106 may transmit the failure information message via a DCCH logical channel over a signaling resource bearer (SRB), such as SRB 1 and/or SRB 3. For instance, the failure information message may be transmitted to one of the cell sites 121-124 to which the UE 106 maintains an RRC connected state (where the one of the cell sites 121-124 may comprise a PCell/MN and/or MCG, or may comprise an SCell/SN and/or SCG, depending upon the particular scenario).

In an example involving dual connectivity, the one of the cell sites 121-124 to which the failure information message is transmitted may also forward the failure information message to one or more other cells/base stations. For instance, if cell site 122 comprises a PCell of a MCG that receives the failure information message regarding a SCG radio link failure regarding a radio link between UE 106 and cell site 123, the cell site 122 may forward the failure information message to cell site 123. Thus, cell site 123 may be informed of possible problems with its own configuration, coverage, and radio environment that may be addressed. Similarly, the receiving cell site 122 may also forward the failure information message, or information derived therefrom, to one or more components of core cellular network 130, such as application server (AS) 195, SON/SDN controller 190, and so forth. For instance, AS 195 may comprise a network planning server that aggregates information and forecasts network demand, network coverage gaps, and so forth. For example, AS 195 may gather failure information messages and/or may compile information from additional data sources to generate periodic reports, charts, and/or other visualizations relating to radio link failures for review by network personnel.

In one example, as noted above, SON/SDN controller 190 may also obtain failure information reports and/or information derived therefrom, and may use such information to configure and reconfigure components of access network 120 and/or cellular core network 130. For instance, multiple failure information messages may indicate radio link failures for a secondary cell group which is expected to have overlapping coverage in a particular area. For instance, there may be a temporary gap in SCG coverage at a particular location, or there may be a more permanent gap that is not anticipated due to some unforeseen condition(s) such that the cell boundaries of cells in the SCG do not actually include the location. In addition, a lack of coverage may be determined from the multiple failure information messages pertaining to the SCG being received from endpoint devices/UEs at or near a same location. As such, the SON/SDN controller 190 may take one or several actions, such as instructing UEs to switch to LTE connectivity from NR connectivity (e.g., due to LTE generally having a greater range), instructing UEs to switch to LTE-LTE dual connectivity (for the same or similar anticipated improvement), activating remote radio heads (RRHs) and/or BBU pools to provide additional active SCells (e.g., where such physical components are already deployed and installed, but are inactive), instructing base stations/RRHs to adjust vertical tilt angles, azimuth bearings, beamwidths, power levels, and or other settings, adding (or removing) one or more network slices, and so on.

The foregoing description of the system 100 is provided as an illustrative example only. In other words, the example of system 100 is merely illustrative of one network configuration that is suitable for implementing examples of the present disclosure. As such, other logical and/or physical arrangements for the system 100 may be implemented in accordance with the present disclosure. For example, the system 100 may be expanded to include additional networks, such as network operations center (NOC) networks, additional access networks, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For instance, in one example, the cellular core network 130 may further include a Diameter routing agent (DRA) which may be engaged in the proper routing of messages between other elements within cellular core network 130, and with other components of the system 100, such as a call session control function (CSCF) (not shown) in IMS network 150. In another example, the NSSF 136 may be integrated within the AMF 135. In addition, cellular core network 130 may also include additional 5G NG core components, such as: a policy control function (PCF), an authentication server function (AUSF), a network repository function (NRF), and other application functions (AFs). In one example, any one or more of cell sites 121-123 may comprise 2G, 3G, 4G and/or LTE radios, e.g., in addition to 5G new radio (NR), or gNB functionality. For instance, cell site 123 is illustrated as being in communication with AMF 135 in addition to MME 131 and SGW 132. Thus, these and other modifications are all contemplated within the scope of the present disclosure.

To aid in understanding the present disclosure, FIG. 2 illustrates an example cellular network 200 associated with examples of the present disclosure. In particular, FIG. 2 illustrates an example architecture with one possible configuration of a primary cell group (or "master" cell group (MCG)) 210 and a secondary cell group (SCG) 220. In the present example, the MCG 210 may comprise LTE/4G base stations (e.g., eNodeBs) and the SCG 220 may comprise 5G/NR base stations (e.g., gNodeBs or gNBs). In one example, the MCG 210 includes cells/base stations with a greater coverage, service area/range, or footprint as compared to the nodes/cells of the SCG 220. For instance, a cell area 280 associated with one of the cells of the MCG 210 and a cell area 285 associated with one of the cells of the SCG 220 are labeled for comparative purposes. For example, the SCG 220 may comprise NR base stations (gNBs) operating at millimeter wave frequencies. As further illustrated in FIG. 2, an endpoint device, or user equipment (UE) 299 may have the choice or ability to connect to base stations of either or both of LTE/4G base stations or 5G/NR base stations. However, in the present configuration as illustrated in FIG. 2, the UE 299 and the cellular network 200 are configured to operate in an MR-DC mode, in which base stations of a first type of RAT (e.g., LTE/4G eNodeBs) comprise MCG 210 and base stations of a second type of RAT (e.g., 5G/NR gNBs) comprise SCG 220. In other words, FIG. 2 illustrates an example of EN-DC.

Figure 3:
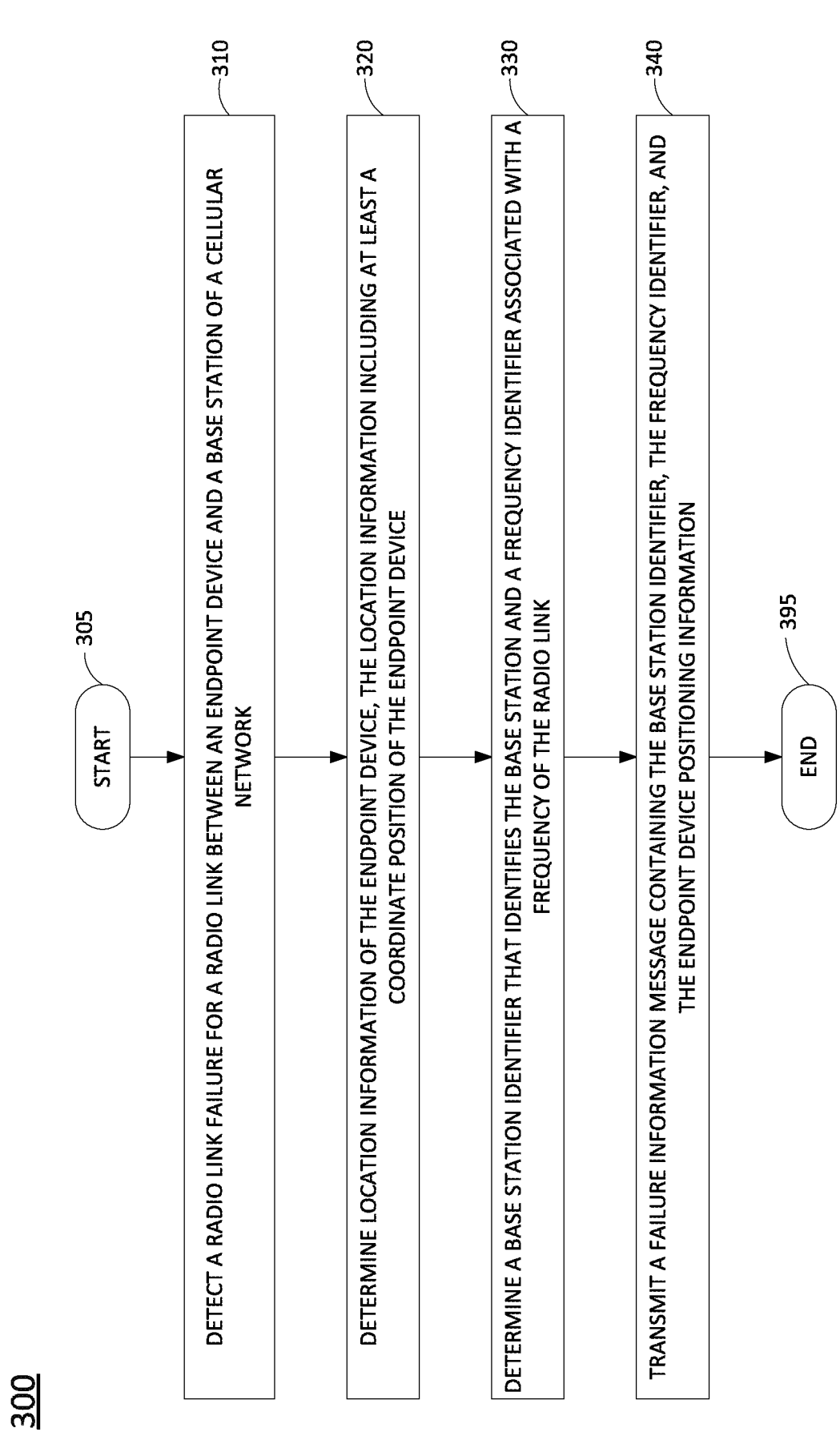
FIG. 3 illustrates a flowchart of an example method for transmitting a failure information message containing a base station identifier, a frequency identifier, and endpoint device positioning information associated with a radio link failure.

FIG. 3 illustrates a flowchart of an example method 300 for transmitting a failure information message containing a base station identifier, a frequency identifier, and endpoint device positioning information associated with a radio link failure, in accordance with the present disclosure. In one example, steps, functions and/or operations of the method 300 may be performed by a device as illustrated in FIG. 1, e.g., endpoint device/UE 106, or any one or more components thereof, such as a processing system, or collectively via a plurality devices in FIG. 1, such as UE 106 in conjunction with any one or more of cell sites 121-124, SON/SDN controller 190, and so forth. In one example, the steps, functions, or operations of method 300 may be performed by a computing device or system 400, and/or a processing system 402 as described in connection with FIG. 4 below. For instance, the computing device or system 400 may represent at least a portion of an endpoint device/or UE that is configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system, such as processing system 402. The method 300 begins in step 305 and proceeds to step 310.

At step 310, the processing system (e.g., of an endpoint device, or UE) detects a radio link failure for a radio link between the endpoint device and a base station of a cellular network. In one example, step 310 may include detecting a type of the radio link failure. As noted above, in one example, the cellular network and the endpoint device are configured for dual connectivity. In addition, as noted above, in one example, the dual connectivity may be in accordance with two different types of radio access technologies, such as an LTE radio access technology and a 5G radio access technology. In one example, a primary cell group of the cellular network associated with the endpoint device operates in accordance with a first type of radio access technology, and a secondary cell group of the cellular network associated with the endpoint device operates in accordance with a second type of radio access technology. In one example, the radio link failure may be detected with respect to the primary cell group. In other words, in such an example, the primary cell group may comprise the base station (e.g., a PCell). In another example, the radio link failure may be detected with respect to a secondary cell group. In other words, in such an example, the secondary cell group may comprise the base station (e.g., an SCell).

In various examples, the radio link failure may be associated with a PCell/MN and/or MCG, with the endpoint device in either a dual connectivity or non-dual connectivity state. The PCell/MCG may comprise a 4G/LTE base station, such as eNodeB, or may comprise a 5G/NR base station, such as a gNB. In a dual connectivity state, the secondary cell group may comprise components of either RAT, respectively. In other words, the dual connectivity may be MR-DC (including EN-DC and NE-DC), NR-DC, or LTE-LTE DC. In another example, the failure information message may relate to a radio link failure associated with an SCell/SN and/or SCG with the endpoint device in a dual connectivity state. Again, the dual connectivity may be MR-DC (including EN-DC and NE-DC), NR-DC, or LTE-LTE DC.

At step 320, the processing system determines location information of the endpoint device, where the location information includes at least a coordinate position of the endpoint device (e.g., at or near the time the failure is detected). In one example, step 320 may include determining an altitude, or an elevation, of the endpoint device (e.g., in accordance with measurement(s) from a barometer of the endpoint device). Alternatively, or in addition, step 320 may include determining orientation information of the endpoint device, such as a yaw, a pitch, or a roll, and/or a bearing (which may comprise a compass bearing, e.g., with reference to true north or magnetic north, a bearing to the base station, or other reference point, etc.). In one example, step 320 may further include determining a velocity of the endpoint device.

At step 330, the processing system determines a base station identifier that identifies the base station and a frequency identifier associated with a frequency of the radio link. For instance, the processing system (e.g., directly or via another component of the endpoint device) may maintain information on radio links that are established or that are attempted to be established, either as new connections, via handover, reconnections, and/or reconfigurations. The information may include the identities of any PCells and/or any SCells to which the endpoint device has radio links (e.g., RRC connected) and/or to which the endpoint device attempts to establish radio links. The base station identifier may comprise a locally unique identifier (for at least a portion of the cellular network) or a network-wide unique identifier. In one example, the base station identifier may comprise a cell ID. In one example, the frequency identifier may comprise an indication of the center frequency, or carrier frequency, associated with a radio link for which the radio link failure is detected. Alternatively, or in addition, the frequency identifier may comprise a logical channel identifier that can be mapped to the center/carrier frequency of the radio link.

At step 340, the processing system transmits a failure information message (broadly, a "radio link failure information message") containing the base station identifier, the frequency identifier, and the endpoint device positioning information. In one example, the failure information message further includes the type of the radio link failure. Depending upon the particular example, the failure information message may comprise one of: a Failure Information message, a MCGFailureInformation message, a SCGFailureInformation message, a SCGFailureInformationNR message, or a SCGFailureInformationEUTRA message, associated with different types of dual connectivity or non-dual connectivity, as described above. For instance, the failure information message may be one of a UL-DCCH-Message class/message type and/or message class extension (but also specifically including a base station identifier, a frequency identifier, and endpoint device positioning information (and/ or failure type) associated with the radio link failure). It should be noted that the failure information message may be transmitted in response to detecting the radio link failure (e.g., automatically by the processing system, without a request or prompt from the cellular network). In one example, the base station identifier, the frequency identifier, and the endpoint device positioning information are contained within at least one information element of the failure information message. For instance, such information may be included as fields within a same information element, or may be included in separate information elements. In one example, the failure information message is transmitted on an uplink DCCH logical channel, e.g., over a signaling radio bearer, such as SRB1 or SRB3.

Following step 340, the method 300 proceeds to step 395 where the method 300 ends.

It should be noted that the method 300 may be expanded to include additional steps or may be modified to include additional operations with respect to the steps outlined above. For example, the method 300 may be repeated through various cycles of detecting radio link failures associated with the same or a different base station, and/or for a same or different connectivity configuration (e.g., MR-DC, intra-RAT DC, non-dual connectivity, etc.). In such case, the failure information message(s) may be transmitted to the same or different components of the cellular network depending upon the particular failure that is determined, the connectivity state of the endpoint device, the location of the endpoint device, and so forth. In one example, the method 300 may be expanded to include receiving the failure information message (e.g., at a base station/cell site), forwarding the failure information message to another base station (e.g., the base station for which the radio link failure is detected), forwarding the failure information message to one or more other components of the cellular network, and so forth. Alternatively, or in addition, in one example, the method 300 may further include determining, in response to the failure information message, a change that is calculated to provide an improved configuration of the cellular network, and implementing the change (e.g., activating and deactivating antennas/remote radio heads, steering antennas/ remote radio heads, activating or deactivating one or more baseband units, allocating and/or deallocating baseband units, adding or removing network slices, and so on). Thus, these and other modifications are all contemplated within the scope of the present disclosure.

In addition, although not specifically specified, one or more steps, functions, or operations of the method 300 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 3 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 4 depicts a high-level block diagram of a computing device or processing system specifically programmed to perform the functions described herein. For example, any one or more components or devices illustrated in FIG. 1 or FIG. 2, or described in connection with the example method 300 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for transmitting a failure information message containing a base station identifier, a frequency identifier, and endpoint device positioning information associated with a radio link failure, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like). In accordance with the present disclosure input/output devices 406 may also include antenna elements, antenna arrays, remote radio heads (RRHs), baseband units (BBUs), transceivers, power units, and so forth.

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for transmitting a failure information message containing a base station identifier, a frequency identifier, and endpoint device positioning information associated with a radio link failure (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for transmitting a failure information message containing a base station identifier, a frequency identifier, and endpoint device positioning information associated with a radio link failure (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   detecting, by a processing system including at least one processor of an endpoint device, a radio link failure for a radio link between the endpoint device and a first base station of a cellular network, wherein the first base station comprises a base station of a primary cell group associated with the endpoint device;
   determining, by the processing system, location information of the endpoint device, wherein the location information includes at least a coordinate position of the endpoint device, wherein the location information of the endpoint device further includes orientation information of the endpoint device, wherein the orientation information comprises at least one of: a yaw, a pitch, a roll, or a bearing of the endpoint device;
   determining, by the processing system, a base station identifier that identifies the first base station and a frequency identifier associated with a frequency of the radio link; and
   transmitting, by the processing system to a second base station, a failure information message containing the base station identifier, the frequency identifier, and the location information of the endpoint device, wherein the second base station comprises a base station of a secondary cell group associated with the endpoint device, wherein the endpoint device is configured with a split signaling radio bearer 1 associated with the first base station and the second base station, and wherein the failure information message is transmitted to the second base station via the split signaling radio bearer 1.

2. The method of claim 1, wherein the detecting the radio link failure includes detecting a type of the radio link failure.

3. The method of claim 2, wherein the failure information message further includes the type of the radio link failure.

4. The method of claim 1, wherein the cellular network and the endpoint device are configured for dual connectivity.

5. The method of claim 4, wherein the dual connectivity is in accordance with two different types of radio access technologies.

6. The method of claim 5, wherein the two different types of radio access technologies comprise a long term evolution radio access technology and a fifth generation radio access technology.

7. The method of claim 1, wherein the primary cell group operates in accordance with a first type of radio access technology, and wherein the secondary cell group associated with the endpoint device operates in accordance with a second type of radio access technology.

8. The method of claim 1, wherein the failure information message is transmitted in response to the detecting the radio link failure.

9. The method of claim 1, wherein the failure information message is transmitted without a request from the cellular network.

10. The method of claim 1, wherein the failure information message comprises:
a FailureInformation message; or
a MCGFailureInformation message.

11. The method of claim 1, wherein the base station identifier, the frequency identifier, and the location information of the endpoint device are contained within at least one information element of the failure information message.

12. The method of claim 1, wherein the failure information message is transmitted on an uplink DCCH logical channel.

13. The method of claim 1, wherein the location information of the endpoint device further includes at least one of: an altitude, or an elevation.

14. The method of claim 1, wherein the location information of the endpoint device further includes a velocity.

15. A non-transitory computer-readable medium storing instructions which, when executed by a processing system of an endpoint device including at least one processor, cause the processing system to perform operations, the operations comprising:
detecting a radio link failure for a radio link between the endpoint device and a first base station of a cellular network, wherein the first base station comprises a base station of a primary cell group associated with the endpoint device;
determining location information of the endpoint device, wherein the location information includes at least a coordinate position of the endpoint device, wherein the location information of the endpoint device further includes orientation information of the endpoint device, wherein the orientation information comprises at least one of: a yaw, a pitch, a roll, or a bearing of the endpoint device;
determining a base station identifier that identifies the first base station and a frequency identifier associated with a frequency of the radio link; and
transmitting, to a second base station, a failure information message containing the base station identifier, the frequency identifier, and the location information of the endpoint device, wherein the second base station comprises a base station of a secondary cell group associated with the endpoint device, wherein the endpoint device is configured with a split signaling radio bearer 1 associated with the first base station and the second base station, and wherein the failure information message is transmitted to the second base station via the split signaling radio bearer 1.

16. An endpoint device comprising:
a processing system including at least one processor; and
a non-transitory computer-readable medium storing instructions which, when executed by the processing system, cause the processing system to perform operations, the operations comprising:
detecting a radio link failure for a radio link between the endpoint device and a first base station of a cellular network, wherein the first base station comprises a base station of a primary cell group associated with the endpoint device;
determining location information of the endpoint device, wherein the location information includes at least a coordinate position of the endpoint device, wherein the location information of the endpoint device further includes orientation information of the endpoint device, wherein the orientation information comprises at least one of: a yaw, a pitch, a roll, or a bearing of the endpoint device;
determining a base station identifier that identifies the first base station and a frequency identifier associated with a frequency of the radio link; and
transmitting, to a second base station, a failure information message containing the base station identifier, the frequency identifier, and the location information of the endpoint device, wherein the second base station comprises a base station of a secondary cell group associated with the endpoint device, wherein the endpoint device is configured with a split signaling radio bearer 1 associated with the first base station and the second base station, and wherein the failure information message is transmitted to the second base station via the split signaling radio bearer 1.

17. The endpoint device of claim 16, wherein the detecting the radio link failure includes detecting a type of the radio link failure.

18. The endpoint device of claim 17, wherein the failure information message further includes the type of the radio link failure.

19. The endpoint device of claim 16, wherein the cellular network and the endpoint device are configured for dual connectivity.

20. The endpoint device of claim 19, wherein the dual connectivity is in accordance with two different types of radio access technologies.

* * * * *